United States Patent
Hah (10) Patent No.: US 12,552,768 B2
(45) Date of Patent: Feb. 17, 2026

(54) PYRIDINYLPYRAZOLE DERIVATIVE OR PHARMACEUTICALLY ACCEPTABLE SALT THEREOF AND USE THEREOF

(71) Applicant: INDUSTRY-UNIVERSITY COOPERATION FOUNDATION HANYANG UNIVERSITY ERICA CAMPUS, Ansan-si (KR)

(72) Inventor: Jung Mi Hah, Seoul (KR)

(73) Assignees: INDUSTRY-UNIVERSITY COOPERATION FOUNDATION, Ansan-si (KR); HANYANG UNIVERSITY ERICA CAMPUS, Ansan-si (KR)

( * ) Notice: Subject to any disclaimer, the term of this patent is extended or adjusted under 35 U.S.C. 154(b) by 336 days.

(21) Appl. No.: 18/265,425

(22) PCT Filed: Feb. 16, 2022

(86) PCT No.: PCT/KR2022/002263
§ 371 (c)(1),
(2) Date: Jun. 5, 2023

(87) PCT Pub. No.: WO2022/186512
PCT Pub. Date: Sep. 9, 2022

(65) Prior Publication Data
US 2024/0043399 A1  Feb. 8, 2024

(30) Foreign Application Priority Data

Mar. 4, 2021 (KR) .................. 10-2021-0028799
Feb. 7, 2022 (KR) .................. 10-2022-0015737

(51) Int. Cl.
C07D 401/04 (2006.01)
C07D 401/14 (2006.01)
C07D 405/14 (2006.01)

(52) U.S. Cl.
CPC ......... *C07D 401/04* (2013.01); *C07D 401/14* (2013.01); *C07D 405/14* (2013.01)

(58) Field of Classification Search
CPC ... C07D 401/04; C07D 401/14; C07D 405/14
See application file for complete search history.

(56) References Cited

U.S. PATENT DOCUMENTS

2008/0070894 A1   3/2008   Kawamura et al.
2014/0336225 A1  11/2014   Burnet et al.
2016/0304466 A1  10/2016   Feng et al.

FOREIGN PATENT DOCUMENTS

KR    20080095902 A    10/2008
WO    WO9712876 A      4/1997

OTHER PUBLICATIONS

Sato, Y.; Onozaki, Y.; Sugimoto, T.; et al. "Imidazopyridine derivatives as potent and selective Polo-like kinase (PLK) inhibitors" Bioorganic & Medicinal Chemistry Letters 19 (2009) 4673-4678 (Year: 2009).*

(Continued)

*Primary Examiner* — Andrew D Kosar
*Assistant Examiner* — John D Mcanany
(74) *Attorney, Agent, or Firm* — STIP Law Group, LLC (57) ABSTRACT

The present disclosure relates to a pyridinylpyrazole derivative or a pharmaceutically acceptable salt thereof and a composition for preventing or treating a protein kinase-related disease, which contains the derivative or salt as an active ingredient. Since the pyridinylpyrazole derivative of the present disclosure exhibits cytotoxicity by inhibiting polo-like kinase 1 (PLK1), which induces cell proliferation, when administered to an individual, it can be used for prevention or treatment of a protein kinase-related disease, specifically for prevention or treatment of cancer.

11 Claims, 3 Drawing Sheets

(56) References Cited

OTHER PUBLICATIONS

International search report of PCT/KR2022/002263, May 31, 2022, English translation.
Rebecca A. Maccorkle and Tse-Hua Tan, Inhibition of JNK2 Disrupts Anaphase and Produces Aneuploidy in Mammalian Cells, The Journal of Biological Chemistry, Sep. 17, 2004, vol. 279, No. 38, pp. 40112-40121, The American Society for Biochemistry and Molecular Biology, Inc. Rockville, USA.

\* cited by examiner

PYRIDINYLPYRAZOLE DERIVATIVE OR PHARMACEUTICALLY ACCEPTABLE SALT THEREOF AND USE THEREOF

CROSS-REFERENCE TO RELATED APPLICATIONS

This application is the U.S. National Phase under 35 U.S.C. § 371 of International Application No. PCT/KR2022/002263, filed on Feb. 16, 2022, which in turn claims the benefit of Korean Application No. 10-2021-0028799, filed on Mar. 4, 2021, and 10-2022-0015737, filed on Feb. 7, 2022, the disclosures of which are incorporated by reference into the present application.

TECHNICAL FIELD

The present disclosure relates to a pyridinylpyrazole derivative or a pharmaceutically acceptable salt thereof and a use thereof.

BACKGROUND ART

Polo-like kinases (PLKs) are a family of five serine/threonine kinases that have been identified in various eukaryotic organisms and play an important in cell proliferation particularly in cell cycle regulation. PLK1 is deeply involved in the mitotic cell cycle. The level of PLK1 is increased in the S phase, reaches maximum during mitosis, and decreases gradually in the G phase. Accordingly, it is though that PLK1 induces cell proliferation. The overexpression of PLK1 is often found in malignant tumors. PLK1 is overexpressed in various human cancers including leukemia. It is regarded as an attractive target for an anticancer agent and the development of PLK1 inhibitors is being conducted actively by many research groups. In contrast, PLK2 (also known as Snk) and PLK3 (also known as FNK or PRK) are known as tumor suppressors. Therefore, the development of a PLK1 inhibitor having isoform selectivity is very important.

Furthermore, PLK1 has been found to be associated with drug resistance of a number of anticancer agents such as doxorubicin, paclitaxel and gemcitabine. It is presumed that PLK1 facilitates the cell cycle and inactivates p53 directly or indirectly. This suggests that the inhibition of PLK1 may be very useful for drug resistance in anticancer monotherapies or combination therapies.

Due to these characteristics, many research groups are focusing on the development of PLK1 inhibitors. Although some PLK1 inhibitors have succeed in preclinical trials and entered the phase 1 clinical trials, most of them have failed due to cytotoxicity. Among them, the PLK1 inhibitors such as BI 2536 and GSK461364A have passed the phase 1 clinical trials and have entered the phase 2 and 3 clinical trials as therapeutic agents for specific malignant tumors. However, the PLK1 inhibitors have not shown expected efficacy in the phase 2 and 3 clinical trials. Only a few patients showed disease stabilization. This suggests that further investigation and follow-up treatment are necessary for the PLK1 inhibitors.

In the field of clinical chemistry, it is very important to understand the structure-activity relationship (SAR) for drug development. The SAR is time-consuming and labor-intensive because it requires the synthesis of numerous compounds and establishment of biological activity data. In contrast, the in-silico approach is advantageous in that it is more effective in terms of time and cost because SAR is extracted by statistically analyzing known active compounds and the SAR is converted to 3D quantitative structure-activity relationship (3D-QSAR) through calculation. The QSAR result shows the characteristics of a ligand to be improved, such as steric and electrostatic interaction, hydrogen bonding affinity, hydrophobicity, etc.

In this context, the inventors of the present disclosure have performed QSAR studies of two known PLK1 inhibitor series and proposed a new structure based on hybridization of QSAR models for discovery of a novel, effective PLK1 inhibitor. Of known 3D-QSAR methods, comparative molecular field analysis (CoMFA) and comparative molecular similarity index analysis (CoMSIA) are the most common. The inventors of the present disclosure used them for validation of a hybridized QSAR model. As a result, the inventors of the present disclosure have identified that a benzyloxyaminopyridinylpyrazole carboxamide derivative has proper inhibitory activity against PLK1 and improved selectivity, and have completed the present disclosure.

DISCLOSURE

Technical Problem

The present disclosure is directed to providing a pyridinylpyrazole derivative or a pharmaceutically acceptable salt thereof.

The present disclosure is also directed to providing a composition for inhibiting polo-like kinase 1 (PLK1), which contains the derivative or the pharmaceutically acceptable salt thereof as an active ingredient.

The present disclosure is also directed to providing a composition for preventing or treating cancer, which contains the derivative or the pharmaceutically acceptable salt thereof as an active ingredient.

However, the problems to be solved by the present disclosure are not limited to those described above and other unmentioned problems will be clearly understood by those having ordinary skill in the art from the following description.

Technical Solution

The present disclosure provides a pyridinylpyrazole derivative represented by [Chemical Formula 1] or a racemate, isomer, solvate or pharmaceutically acceptable salt thereof.

[Chemical Formula 1]

In an exemplary embodiment of the present disclosure, in [Chemical Formula 1], $R^1$ is any one selected from a group consisting of a substituted or unsubstituted $C_1$-$C_9$ chain alkyl group or cyclic alkyl group, a substituted or unsubstituted $C_3$-$C_9$ heterocycloalkyl group, and a substituted or unsubstituted $C_5$-$C_9$ aryl group or heteroaryl group, each of $R^2$ and $R^3$, which are identical to or different from each other, is independently any one selected from a group consisting of hydrogen, a halogen group, a trifluoromethyl group, a hydroxyl group, and a $C_1$-$C_9$ alkylamino group, and $R^4$ is hydrogen or a $C_1$-$C_9$ chain alkyl group.

In another exemplary embodiment of the present disclosure, the substituted aryl group may be substituted with a $C_1$-$C_9$ alkyl group or alkoxy group.

In another exemplary embodiment of the present disclosure, the $R^1$ may be any one selected from a group consisting of

In another exemplary embodiment of the present disclosure, the $R^2$ may be any one selected from a group consisting of hydrogen, a halogen group, and a trifluoromethyl group.

In another exemplary embodiment of the present disclosure, the $R^3$ may be any one selected from a group consisting of hydrogen, a hydroxyl group, and a $C_1$-$C_3$ alkylamino group.

In another exemplary embodiment of the present disclosure, the $R^2$ may be located at the ortho position, and the $R^3$ may be located at the para position.

In another exemplary embodiment of the present disclosure, the pyridinylpyrazole derivative represented by [Chemical Formula 1] may be any one selected from a group consisting of compounds represented by the following chemical formulas.

[Chemical Formula 1-1]

[Chemical Formula 1-2]

[Chemical Formula 1-3]

[Chemical Formula 1-4]

[Chemical Formula 1-5]

[Chemical Formula 1-6]

[Chemical Formula 1-7]

[Chemical Formula 1-8]

[Chemical Formula 1-9]

[Chemical Formula 1-10]

[Chemical Formula 1-11]

In another exemplary embodiment of the present disclosure, the pyridinylpyrazole derivative or the pharmaceutically acceptable salt thereof may inhibit polo-like kinase 1 (PLK1).

The present disclosure also provides a composition for inhibiting a protein kinase, specifically composition for inhibiting polo-like kinase 1 (PLK1), which contains the pyridinylpyrazole derivative or the pharmaceutically acceptable salt thereof as an active ingredient.

The present disclosure also provides a composition for preventing or treating a protein kinase-related disease, specifically cancer, which contains the pyridinylpyrazole derivative or the pharmaceutically acceptable salt thereof as an active ingredient.

The present disclosure also provides a method for preventing or treating a protein kinase-related disease, specifically cancer, which includes a step of administering the pyridinylpyrazole derivative or the pharmaceutically acceptable salt thereof to an individual.

The present disclosure also provides a use of the pyridinylpyrazole derivative or the pharmaceutically acceptable salt thereof for preparation of a drug for preventing or treating a protein kinase-related disease, specifically cancer.

In an exemplary embodiment of the present disclosure, the cancer may be one or more selected from a group consisting of skin cancer, breast cancer, uterine cancer, esophageal cancer, stomach cancer, brain tumor, colon cancer, rectal cancer, colorectal cancer, lung cancer, ovarian cancer, cervical cancer, endometrial cancer, vulvar cancer, kidney cancer, blood cancer, pancreatic cancer, prostate cancer, testicular cancer, laryngeal cancer, head and neck cancer, thyroid cancer, liver cancer, bladder cancer, osteosarcoma, lymphoma, leukemia, thymus cancer, urethral cancer, and bronchial cancer, although not being limited thereto.

Advantageous Effects

The present disclosure relates to a pyridinylpyrazole derivative or a pharmaceutically acceptable salt thereof and a composition for preventing or treating a protein kinase-related disease, which contains the derivative or the salt as an active ingredient. Since the pyridinylpyrazole derivative of the present disclosure exhibits cytotoxicity by inhibiting polo-like kinase 1 (PLK1), which induces cell proliferation, when administered to an individual, it can be used for prevention or treatment of a protein kinase-related disease, specifically for prevention or treatment of cancer.

The advantageous effects of the present disclosure are not limited to those described above and other unmentioned effects will be clearly understood by those having ordinary skill in the art from the following description.

BEST MODE

The inventors of the present disclosure have designed and synthesized a series of 4-benzyloxy-1-(2-(aryl/alkylamino) pyridin-4-yl)-1H-pyrazole-3-carboxamide derivatives based on hybridized QSAR models of 8-amino-4,5-dihydro-1H-pyrazolo[4,3-h]quinazoline-3-carboxamide and thiophene-2-carboxamide. The pyridinylpyrazole derivatives showed superior inhibitory activity against polo-like kinase 1 (PLK1) which plays an important role in cell cycle progression and proliferation in cancer cells. In particular, 4-((2-chloro-4-(hydroxymethyl)benzyloxy)-1-(2-(phenylamino) pyridin-4-yl)-1H-pyrazole-3-carboxamide (compound 15) showed the highest inhibitory activity against PLK1 and showed a superior effect of inhibiting PLK1 selectively as compared to other protein kinases.

Based on these results, the present disclosure provides a pyridinylpyrazole derivative represented by [Chemical Formula 1] or a pharmaceutically acceptable salt thereof.

[Chemical Formula 1]

In an exemplary embodiment of the present disclosure, in [Chemical Formula 1], $R^1$ may be any one selected from a group consisting of a substituted or unsubstituted $C_1$-$C_9$ chain alkyl group or cyclic alkyl group, a substituted or unsubstituted $C_3$-$C_9$ heterocycloalkyl group, and a substituted or unsubstituted $C_5$-$C_9$ aryl group or heteroaryl group, each of $R^2$ and $R^3$, which are identical to or different from each other, may independently be any one selected from a group consisting of hydrogen, a halogen group, a trifluoromethyl group, a hydroxyl group, and a $C_1$-$C_9$ alkylamino group, and $R^4$ may be hydrogen or a $C_1$-$C_9$ chain alkyl group, although not being limited thereto.

In the present disclosure, the term "substitution" refers to a reaction during which an atom or a group of atoms contained in a compound is replaced by another atom or group of atoms.

In the present disclosure, the term "chain" refers to a molecule having a chain structure. The chain structure is a chemical structure wherein carbon atoms are linked with a chain shape, and includes a straight chain and a branched chain.

In the present disclosure, the term "cyclic" refers to a structure wherein some of the atoms of an organic compound are connected to form a ring.

In the present disclosure, the term "chain or cyclic alkyl group" refers to a primary linear, branched or cyclic saturated hydrocarbon residue having 1-12 carbon atoms and consisting only of carbon and hydrogen atoms. Examples of the alkyl group include methyl, ethyl, propyl, isopropyl, butyl, isobutyl, 2-butyl, 3-butyl, pentyl, n-hexyl, cyclobutyl, cyclopentyl, cyclohexyl, etc. but are not limited thereto.

In the present disclosure, the term "heterocycloalkyl group" commonly refers to a saturated or unsaturated (but not aromatic) cyclohydrocarbon containing at least one heteroatom selected from N, O or S, which may be unsubstituted, mono-substituted or multi-substituted.

In the present disclosure, the term "aryl group" refers to a $C_{6-20}$ unsaturated aromatic ring compound having a single ring (e.g., phenyl) or a plurality of condensed rings (e.g., naphthyl). Examples of the aryl group include phenyl, naphthyl, etc. but are not limited thereto.

In the present disclosure, the term "heteroaryl group" refers to a single ring or a plurality of condensed rings containing at least one heteroatom such as N, O or S. Examples of the heteroaryl group include pyridyl, pyrimidinyl, pyrazinyl, oxazolyl, furyl, etc. but are not limited thereto.

In the present disclosure, the term "halogen group" may refer to fluorine (F), chlorine (Cl), bromine (Br), iodine (I), etc.

In the present disclosure, the term "alkoxy group" refers to an alkyl group bonded to oxygen (—O—R). Examples of the alkoxy group include methoxy, ethoxy, propoxy, butoxy, etc. but are not limited thereto.

In the present disclosure, the $R^1$ may be more specifically

In the present disclosure, the term "pharmaceutically acceptable salt" refers to a compound which possesses the desired biological activity and physical properties of a parent compound without inducing severe side effects in an organism to which it is administered. The pharmaceutically acceptable salt may be obtained by reacting the compound of the present disclosure with an inorganic acid such as hydrochloric acid, bromic acid, sulfuric acid, nitric acid, phosphoric acid, etc. or an organic acid such as sulfonic acid, e.g., methanesulfonic acid, ethanesulfonic acid, p-toluenesulfonic acid, etc., tartaric acid, formic acid, citric acid, acetic acid, trichloroacetic acid, trifluoroacetic acid, capric acid, isobutyric acid, malonic acid, succinic acid, phthalic acid, gluconic acid, benzoic acid, lactic acid, fumaric acid, maleic acid, salicylic acid, etc. In addition, the compound of the present disclosure may be reacted with a base to form an ammonium salt, an alkali metal salt such as a sodium or potassium salt, an alkaline earth metal salt such as a calcium or magnesium salt, an organic base alt such as dicyclohexylamine, N-methyl-D-glucamine, tris(hydroxymethyl)methylamine, etc. or an amino acid salt such as arginine, lysine, etc.

In addition, the pyridinylpyrazole derivative or the pharmaceutically acceptable salt thereof may include, in addition to the pharmaceutically acceptable salt, any salt, hydrate or solvate that may be prepared by common methods.

Since the pyridinylpyrazole derivative of the present disclosure can inhibit protein kinases which induce cell proliferation, a pharmaceutical composition containing the pyridinylpyrazole derivative or the pharmaceutically acceptable salt thereof as an active ingredient may be used as a pharmaceutical composition for preventing or treating a protein kinase-related disease. The protein kinase may be polo-like kinase 1 (PLK1).

In addition, the present disclosure may provide a method for preventing, treating and/or diagnosing a protein kinase-related disease, which includes a step of administering the pyridinylpyrazole derivative or the pharmaceutically acceptable salt thereof to an individual.

In the present disclosure, the term "prevention" refers to any action of restraining or delaying the onset, spread or recurrence of a protein kinase-related disease by administering the composition of the present disclosure, and "treatment" refers to any action of ameliorating or favorably changing the symptoms of the disease by administering the composition of the present disclosure.

In the present disclosure, the term "pharmaceutical composition" refers to a composition prepared for the purpose of preventing or treating a disease, and it may be prepared into various formulations according to common methods. For example, it may be prepared into oral formulations such as a powder, a granule, a tablet, a capsule, a suspension, an emulsion, a syrup, etc. or into a formulation for external application, a suppository, or a sterilized solution for injection.

In the present disclosure, "containing as an active ingredient" means that the corresponding ingredient is contained in an amount necessary or sufficient for achieving the desired biological effect. For actual application, the amount of the active ingredient may be determined as an amount for treating the target disease without causing toxicity. For example, the amount may be varied depending on various factors such as the disease or condition to be treated, the type of the administered composition, the size of a subject, the severity of the disease or condition, etc. Those having ordinary skill in the art to which the present disclosure belongs can empirically determine the effective amount of the composition without conducting excessive experiments.

The pharmaceutical composition of the present disclosure may further contain one or more pharmaceutically acceptable carrier in addition to the above-described active ingredient depending on particular formulations.

The pharmaceutically acceptable carrier may be one or more of saline, sterile water, Ringer's solution, buffered saline, dextrose solution, maltodextrin solution, glycerol and ethanol and, if necessary, another common additive such as an antioxidant, a buffer, a bacteriostat, etc. may be further contained. In addition, an injectable formulation such as an aqueous solution, a suspension, an emulsion, etc., a pill, a capsule, a granule or a tablet may be prepared by further adding a diluent, a dispersant, a surfactant, a binder or a lubricant. Furthermore, a suitable formulation may be prepared depending on the corresponding disease or ingredients according to common methods described in Remington's Pharmaceutical Science (Mack Publishing Company, Easton PA).

The composition of the present disclosure may be administered orally or parenterally with a pharmaceutically effective amount. In the present disclosure, the term "pharmaceutically effective amount" refers to an amount which is sufficient to treat a disease at a reasonable benefit/risk ratio applicable to medical treatment without causing side effects. The level of the effective amount may be determined in consideration of the health condition of a patient, the severity of a disease, drug activity, drug sensitivity, administration method, administration time, administration route, excretion rate, treatment period, drugs used in combination and other factors well known in the medical field.

The pharmaceutical composition of the present disclosure may be administered to an individual to prevent, treat and/or diagnose a protein kinase-related disease. The protein kinase-related disease is not particularly limited but may specifically be cancer. Non-limiting examples of the cancer include skin cancer, breast cancer, uterine cancer, esophageal cancer, stomach cancer, brain tumor, colon cancer, rectal cancer, colorectal cancer, lung cancer, ovarian cancer, cervical cancer, endometrial cancer, vulvar cancer, kidney cancer, blood cancer, pancreatic cancer, prostate cancer, testicular cancer, laryngeal cancer, head and neck cancer, thyroid cancer, liver cancer, bladder cancer, osteosarcoma, lymphoma, leukemia, thymus cancer, urethral cancer, bronchial cancer, etc.

In the present disclosure, the term "individual" is not limited particularly as long as it is a mammal such as livestock, human, etc. requiring the prevention, treatment and/or diagnosis of a protein kinase-related disease. Specifically, it may be human.

The pharmaceutical composition of the present disclosure may be formulate into various forms for administration to an individual. Specifically, a typical formulation for parenteral administration may be an injectable formulation such as an isotonic aqueous solution or suspension. The injectable formulation may be prepared according to a method known in the art using a suitable dispersant, wetting agent or suspending agent. For example, an injectable formulation may be prepared by dissolving the ingredients in saline or a buffer. In addition, formulations for oral administration include, for example, an ingestible tablet, a buccal tablet, a troche, a capsule, an elixir, a suspension, a syrup, a wafer, etc. These formulations may contain, in addition to the active ingredient, a diluent (e.g., lactose, dextrose, sucrose, mannitol, sorbitol, cellulose and/or glycine) and a glidant (e.g., silica, talc, stearic acid and its magnesium or calcium salt and/or polyethylene glycol). The tablet may contain a binder such as magnesium aluminum silicate, starch paste, gelatin, tragacanth, methyl cellulose, sodium carboxymethyl cellulose and/or polyvinylpyrrolidone and, if necessary, may further contain a disintegrant such as starch, agar, and alginic acid or its sodium salt, an absorbent, a colorant, a flavorant and/or a sweetener. The formulations may be prepared by common mixing, granulation or coating methods.

In addition, the pharmaceutical composition of the present disclosure may further contain an adjuvant such as an antiseptic, a wetting agent, an emulsification promoter, a salt or buffer for control of osmotic pressure and other therapeutically useful materials, and may be formulated according to a common method.

The pharmaceutical composition according to the present disclosure may be administered through various routes including oral, transdermal, subcutaneous, intravenous or intramuscular routes, and the administration dose of the active ingredient may be selected adequately depending on various factors such as administration route, the age, sex and body weight of a patient, the severity of a disease, etc. In addition, the composition of the present disclosure may be administered in combination with a known compound capable of enhancing the desired effect.

The pharmaceutical composition according to the present disclosure may be administered to human and animals orally or parenterally, e.g., intravenously, subcutaneously, intranasally, intraperitoneally, etc. The oral administration includes sublingual application. The parenteral administration includes injection such as subcutaneous injection, intramuscular injection and intravenous injection and drip infusion.

An effective amount of the pyridinylpyrazole derivative or the pharmaceutically acceptable salt thereof of the present disclosure may be administered to a patient according to a single-dose or multiple-dose protocol. The active ingredient in the pharmaceutical composition of the present disclosure may be administered at an effective dose of usually 100 μg to 3,000 mg per administration for an adult, once to several times a day, although it may be varied depending on the severity of a disease. However, the effective administration dose of the pyridinylpyrazole derivative or the pharmaceutically acceptable salt thereof may be determined in consideration of administration route, number of administration and various factors such as the age, body weight, health condition and sex of a patient, the severity of a disease, diet, excretion rate, etc.

The formulation, administration route and administration method of the pharmaceutical composition according to the present disclosure are not specially limited as long as the effect desired by the present disclosure is achieved. The pharmaceutical composition of the present disclosure may further contain a known anticancer agent in addition to the pyridinylpyrazole derivative or the pharmaceutically acceptable salt thereof as the active ingredient, and may be combined with another therapy for treatment of a disease.

The terms used in the present specification are used merely for description and are not intended to limit the present disclosure. A singular expression includes a plural expression unless the context explicitly indicates otherwise. In the present specification, it should be understood that the terms such as "include", "have", etc. are intended to indicate that the mentioned features, numbers, steps, operations, components, parts or combinations thereof are present, and are not intended to exclude the possibility of the presence or addition of one or more other features, numbers, steps, operations, components, parts or combinations thereof.

Unless defined otherwise, all the terms used herein including technical or scientific terms have the same meanings as the terms generally understood by those having ordinary knowledge in the art to which the present disclosure belongs. The terms defined in generally used dictionaries should be interpreted as having meanings identical to contextual meanings of the related art, and should not be interpreted as being ideal or excessively formal meanings unless they are explicitly defined otherwise.

Mode for Invention

Hereinafter, the present disclosure will be described in detail through examples while referring to the attached drawings. However, various changes may be made to the examples and the scope of the present disclosure is not limited or restricted by the examples. It should be understood that all changes, equivalents and substitutes of the examples are included in the scope of the present disclosure.

EXAMPLES

1. Rational Design of Hybridized 3D-QSAR Model

First, the inventors of the present disclosure selected series A of 44 8-amino-4,5-dihydro-1H-pyrazolo[4,3-h]quinazoline-3-carboxamide derivatives and series B of 36 thiophene-2-carboxamide derivatives, and sorted 66 of the 80 compounds. 10 compounds with low potency ($IC_{50}>3$ μM) and 4 racemates were excluded to establish a hybridized 3D-QSAR model. The inventors of the present disclosure used $pIC_{50}$ ($=-\log IC_{50}$) value as the dependent variable in the QSAR model and divided the 66 compounds into 6 groups. As a test set in each section, two compounds were selected per group. The remaining 54 compounds excluding the 12 of the test set were used as the training set. Using these, CoMFA models with Gasteiger-Hückel charged descriptor were generated through SYBYL-X 2.1.1 automatic PLS. All the compounds were prepared in 3D conformation with SYBYL-X ligand preparation based on PDB 3KB7. The two series of compounds overlapped two functional groups, thiophene-2-carboxamide and pyrazol-3-carboxamide. The CoMSIA model was generated through a similar process. Steric, electrostatic, hydrophobic, hydrogen bond donor, and hydrogen bond acceptor indices were selected as descriptors. The statistical parameters of the CoMFA and CoMSIA models are described in Table 1.

TABLE 1

| | | Receptor-guided aligned model with MC searching | |
|---|---|---|---|
| Components | | CoMFA | CoMSIA |
| PLS statistics | $q^2$ | 0.657 | 0.641 |
| | $r^2$ | 0.899 | 0.838 |
| | N | 3 | 3 |
| | SEE | 0.348 | 0.335 |
| | F-value | 125.847 | 125.847 |
| | Predictive $r^2$ | 0.899 | 0.838 |
| Field contribution | Steric | 0.396 | 0.044 |
| | Electrostatic | 0.604 | 0.266 |
| | Hydrophobic | — | 0.262 |
| | Donor | — | 0.158 |
| | Acceptor | — | 0.270 |

In Table 1, $q^2$ is the LOO cross-validated correlation coefficient; $r^2$ is the non-cross-validated correlation coefficient; n is the number of components used in the PLS analysis; SEE is the standard error estimate; and the F-value is the F-static for the analysis.

Figure 1:
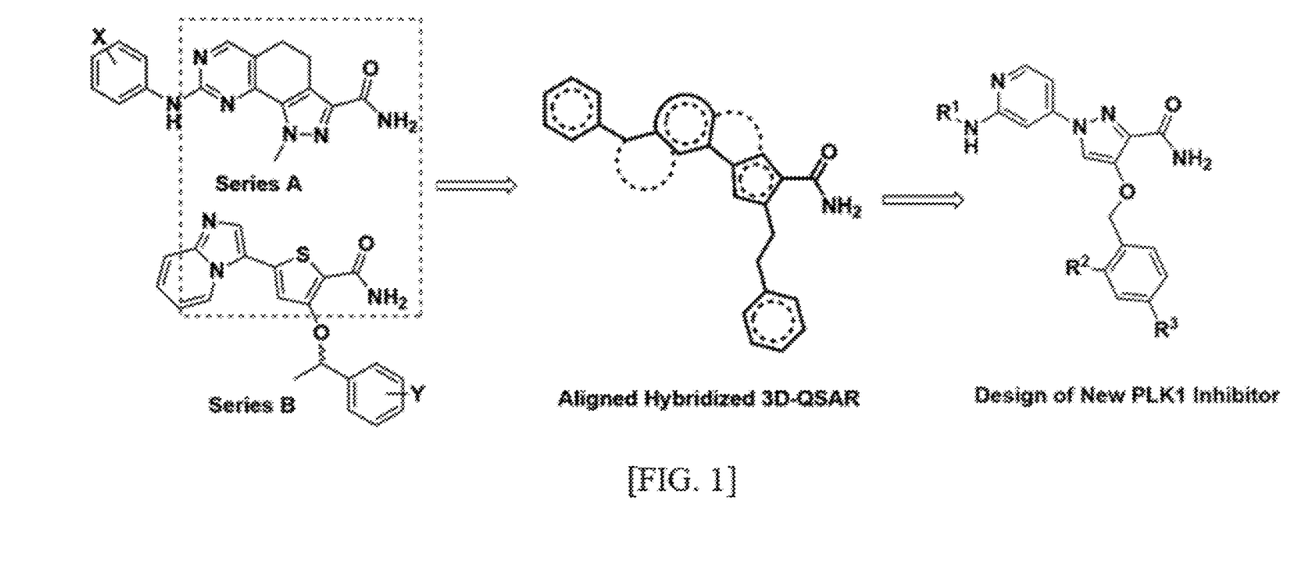
FIG. 1 shows novel PLK1 inhibitors designed from 3D QSAR models obtained by hybridization of series A of 8-amino-4,5-dihydro-1H-pyrazolo[4,3-h]quinazoline-3-carboxamide derivatives (orange) and series B of 36 thiophene-2-carboxamide derivatives (cyan).
Figure 2:
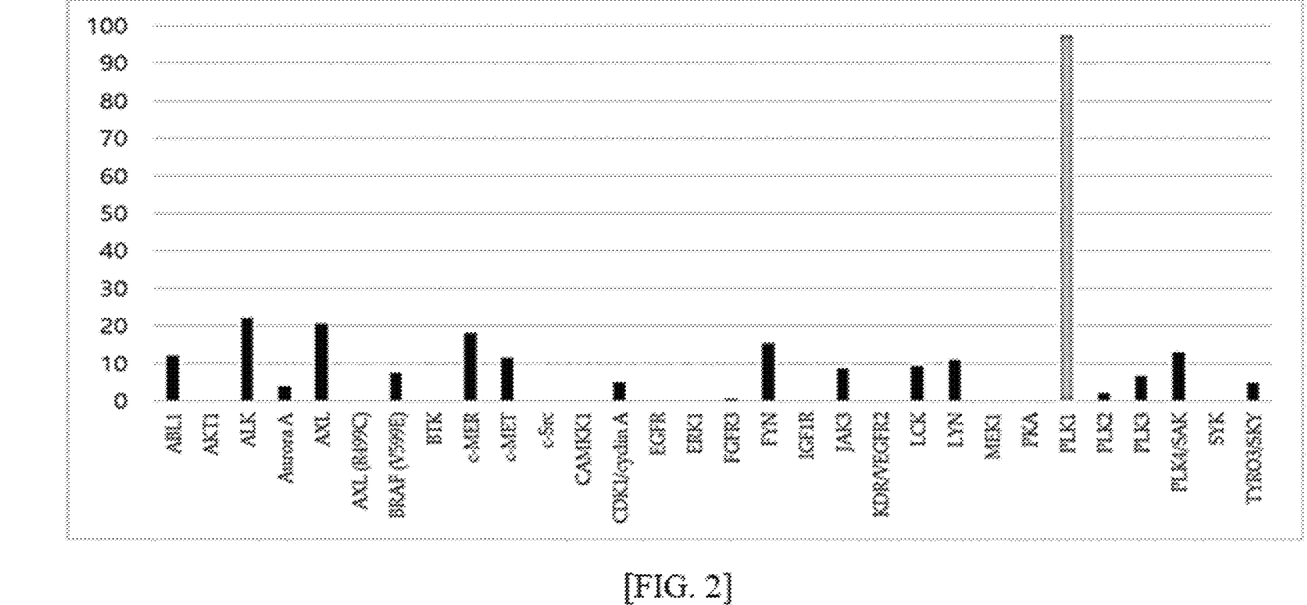
FIG. 2 shows the inhibitory activity of compound 15 (Chemical Formula 1-8) against 30 selected protein kinases when treated at 30 μM.

From the 8-amino-4,5-dihydro-1H-pyrazolo[4,3-h]quinazoline-3-carboxamide derivatives and thiophene-2-carboxamide derivatives, two standard compounds were selected respectively and were matched by Fit Atom in SYBYL-X 2.1.1 to integrate the QSAR models. As a result, 4-((2-$R^2$-4-$R^3$-benzyl)oxy)-1-(2-(2-$R^1$-aminopyridin-4-yl)-1H-pyrazole-3-carboxamide was developed as a novel PLK1 inhibitor (FIG. 1).

2. Synthesis of Pyridinylpyrazole Derivative Compounds

2.1. General Experimental Methods

All chemicals were of reagent grade and were purchased from Aldrich (USA). The compounds were separated by column chromatography using silica gel 60 (200-300 mesh ASTM, E. Merck, Germany). The quantity of silica gel used was 50-100 times the weight charged in the column. Thin film chromatography (TLC) was run on a silica gel-coated aluminum sheet (silica gel 60 GF254, E. Merck, Germany) and visualization was performed using ultraviolet (UV) light (254 nm). $^1$H NMR and $^{13}$C NMR spectra were recorded on a Brucker model digital AVANCE III 400 MHz spectrometer at 25° C. using tetramethylsilane (TMS) as an internal standard. High-resolution MS (HR/MS) experiments were conducted with a Finnigan LTQ Orbitrap mass spectrometer (Thermo Fisher Scientific Inc., USA) operated in a positive-ion electrospray mode.

2.2. General Synthesis Methods

The general synthesis method of 4-((2-$R^2$-4-$R^3$-benzyl)oxy)-1-(2-(2-$R^1$-aminopyridin-4-yl)-1H-pyrazole-3-carboxamide (8a-10a, 13a-b, 14a-b, 15-18) is shown in Scheme 1.

15 (X = H),
17 (X = OMe)

16 (X = H),
17 (X = OMe)

For the synthesis of a 1,3,4-substituted pyrazole core, diazotized 2-fluoropyridin-4-amine (1) and ethyl 4-chloro-3-oxobutanoate were azo-coupled to obtain ethyl (E)-4-chloro-2-(2-(2-fluoropyridin-4-yl)hydrazinylidene)-3-oxobutanoate (2) as an intermediate. Subsequently, a proper pyrazole core (3) was formed through cyclization using potassium t-butoxide, and compounds 4a-c were produced by alkylating the hydroxyl group with three different types of benzyl bromide. Next, the fluorine of pyridine was substituted via $S_NAr$ to give compounds 5a-7a, 11a-c and 12a-c according to $R^1$—$NH_2$. Then, the 3-ethyl ester group was converted to carboxamide using ammonia in methanol to synthesize compounds 8a-10a, 13a-b and 14a-b. Using a 2-chloro-4-tert-butyldimethylsilyloxybenzyloxy group (synthesized in two steps from methyl 3-chloro-4-methylbenzoate) as $R^2$, further derivatization was performed after conversion of ethyl ester (11a-c, 12a-c) to a desired product with benzyl alcohol (15, 17) and dimethylamino groups (16, 18) by sequential deprotection and substitution.

2.3. Synthesis of ethyl 1-(2-fluoropyridin-4-yl)-4-hydroxy-1H-pyrazole-3-carboxylate (3)

A solution of $NaNO_2$ (0.776 mmol) and 0.2 mL of $H_2O$ was slowly added to a solution of 2-fluoropyridin-4-amine (0.776 mmol) in 1.35 mL of $H_2O$ and 0.206 mL (2.33 mmol) of 35% HCl at 0° C. After conducting reaction for 30 minutes, a solution of ethyl 4-chloro-3-oxobutanoate (0.776 mmol) and 0.388 mL of EtOH was added to the reaction vessel and NaOAc (4.66 mmol) was added at once, producing a solid. After stirring for 2 hours, the organic layer was extracted with ethyl acetate and dried with anhydrous sodium sulfate ($Na_2SO_4$), and the solvent was evaporated to obtain compound 2. Subsequently, compound 2 was dissolved in 0.776 mL of THF at 0° C. After adding potassium t-butoxide (0.854 mmol), the mixture was stirred for 1 hour. After completion of the reaction, a saturated $NH_4Cl$ solution was added, and the organic layer was extracted with ethyl acetate and dried with anhydrous sodium sulfate ($Na_2SO_4$). After evaporating the solvent, compound 3 (74%) was obtained by purifying by column chromatography using EA:Hex (1:3). $^1$H NMR (400 MHz, DMSO) δ 9.58 (s, 1H), 8.32 (d, J=5.7 Hz, 1H), 8.28 (d, J=1.0 Hz, 1H), 7.84 (dd, J=5.7, 1.3 Hz, 1H), 7.64 (d, J=1.6 Hz, 1H), 4.32 (q, J=7.1 Hz, 2H), 1.31 (t, J=7.1 Hz, 3H).); HRMS (ESI$^+$) calculated for $C_{11}H_{11}FN_3O_3$ [M+H]$^+$: 252.2249, found 252.2699.

2.4. Synthesis of Compounds 4a-4c

Compound 3 (0.0199 mmol) was dissolved in 0.995 mL of DMF at 0° C. and, after adding NaH (0.0239 mmol) and benzyl bromide (0.0199 mmol), the mixture was stirred for 1 hour. After completion of the reaction, the reaction mixture was worked up 6 times with ethyl acetate and brine. The organic layer was dried with anhydrous sodium sulfate ($Na_2SO_4$) and the solvent was evaporated to give compound 4a as a yellow solid (98%). $^1$H NMR (400 MHz, DMSO) δ 8.81 (s, 1H), 8.37 (d, J=5.7 Hz, 1H), 7.86 (d, J=5.7 Hz, 1H), 7.65 (d, J=1.7 Hz, 1H), 7.52-7.46 (m, 2H), 7.46-7.40 (m, 2H), 7.38 (dd, J=5.0, 3.6 Hz, 1H), 5.12 (s, 2H), 4.32 (d, J=7.1 Hz, 2H), 1.31 (t, J=7.1 Hz, 3H); HRMS (ESI$^+$) calculated for $C_{18}H_{17}FN_3O_3$ [M+H]$^+$: 342.3499, found 342.3863.

4b (yellow solid, 92%); $^1$H NMR (400 MHz, DMSO) δ 8.89 (s, 1H), 8.38 (d, J=5.7 Hz, 1H), 7.91 (dd, J=12.4, 6.8 Hz, 2H), 7.80 (dd, J=17.3, 7.9 Hz, 2H), 7.70 (d, J=1.7 Hz, 1H), 7.62 (t, J=7.8 Hz, 1H), 5.26 (s, 2H), 4.33 (q, J=7.1 Hz, 2H), 1.30 (t, J=7.1 Hz, 3H). HRMS (ESI$^+$) calculated for $C_{19}H_{16}F_4N_3O_3$ [M+H]$^+$: 410.3481, found 410.2020.

4c (yellow solid, 56%); $^1$H NMR (400 MHz, DMSO) δ 8.88 (s, 1H), 8.37 (d, J=5.7 Hz, 1H), 7.88 (d, J=5.7 Hz, 1H), 7.67 (d, J=8.1 Hz, 2H), 7.44 (s, 1H), 7.35 (d, J=7.9 Hz, 1H), 5.16 (s, 2H), 4.75 (s, 2H), 4.32 (t, J=7.1 Hz, 2H), 1.31 (t, J=7.1 Hz, 3H), 0.91 (s, 9H), 0.09 (s, 6H). HRMS (ESI$^+$) calculated for $C_{25}H_{32}ClFN_3O_4Si$ [M+H]$^+$: 520.1829/521.0809, found 520.3986/522.4512/542.4369.

2.5. Synthesis of Compounds 5a-7a

Compound 4a (0.0293 mmol) was dissolved in 0.293 mL of DMSO and stirred at 100° C. for 24 hours after adding tetrahydro-2H-pyran-4-amine (0.0586 mmol) and TEA (0.0586 mmol). After completion of the reaction, the reaction mixture was cooled to room temperature and washed with brine after working up 6 times with ethyl acetate. The organic layer was dried with anhydrous sodium sulfate ($Na_2SO_4$) and the solvent was evaporated, followed by purification by column chromatography using EA:Hex (1:1) to obtain compound 5a (38%). $^1$H NMR (400 MHz, CDCl$_3$) δ 8.01 (d, J=6.0 Hz, 1H), 7.55 (s, 1H), 7.45 (dd, J=7.8, 1.1 Hz, 2H), 7.42-7.34 (m, 3H), 6.88 (d, J=1.7 Hz, 1H), 6.76 (dd, J=6.0, 2.0 Hz, 1H), 5.94 (s, 1H), 5.12 (s, 2H), 4.46 (q, J=7.1 Hz, 2H), 4.01 (dt, J=12.2, 3.9 Hz, 2H), 3.92 (s, 1H), 3.57 (td, J=11.8, 2.3 Hz, 2H), 2.02 (s, 2H), 1.65-1.56 (m, 2H), 1.43 (t, J=7.1 Hz, 3H); HRMS (ESI$^+$) calculated for C$_{23}$H$_{27}$N$_4$O$_4$ [M+H]$^+$: 423.4925, found 423.4549.

6a (37%); $^1$H NMR (400 MHz, DMSO) δ 8.60 (s, 1H), 8.10 (d, J=6.1 Hz, 1H), 7.48 (d, J=6.9 Hz, 2H), 7.44-7.34 (m, 3H), 7.11 (d, J=30.0 Hz, 2H), 5.10 (d, J=8.8 Hz, 2H), 4.31 (q, J=7.1 Hz, 2H), 3.82 (s, 1H), 3.62 (s, 2H), 1.91 (s, 2H), 1.78 (d, J=13.1 Hz, 2H), 1.65 (s, 2H), 1.38 (s, 9H), 1.29 (d, J=5.3 Hz, 3H); HRMS (ESI$^+$) calculated for C$_{28}$H$_{36}$N$_5$O$_5$ [M+H]$^+$: 522.6255, found 522.5953.

7a (53%); $^1$H NMR (400 MHz, CDCl$_3$) δ 8.06 (s, 1H), 7.55 (s, 1H), 7.47-7.43 (m, 2H), 7.42-7.33 (m, 3H), 6.82 (d, J=12.8 Hz, 2H), 5.11 (s, 2H), 4.46 (q, J=6.8 Hz, 2H), 4.42-4.34 (m, 1H), 3.73 (dd, J=11.2, 6.0 Hz, 1H), 3.31 (s, 1H), 3.22 (s, 1H), 2.28-2.19 (m, 1H), 1.89 (d, J=9.7 Hz, 2H), 1.46 (s, 9H), 1.42 (d, J=7.1 Hz, 3H), 1.25-1.25 (m, 1H); HRMS (ESI$^+$) calculated for C$_{27}$H$_{34}$N$_5$O$_3$ [M+H]$^+$: 508.5985, found 508.5151.

2.6. Synthesis of 4-(benzyloxy)-1-(2-(phenylamino)pyridin-4-yl)-1H-pyrazole-3-carboxamide (8a-10a, 13a-13b, 14a-14b)

After adding 0.47 mL of 7 N NH$_3$ in MeOH to compound 5a (0.0111 mmol), the mixture was stirred at 60° C. for 16 hours. After completion of the reaction, the reaction mixture was cooled to room temperature and concentrated in vacuo. Compound 8a (Chemical Formula 1-1) was obtained as a white solid (53%) by conducting column chromatography using MC:MeOH (20:1). $^1$H NMR (400 MHz, DMSO) δ 8.44 (s, 1H), 8.04 (d, J=5.7 Hz, 1H), 7.53-7.45 (m, 3H), 7.45-7.39 (m, 2H), 7.38-7.33 (m, 1H), 7.25 (s, 1H), 6.95 (dd, J=5.7, 2.0 Hz, 1H), 6.90 (d, J=1.7 Hz, 1H), 6.75 (d, J=7.7 Hz, 1H), 5.11 (s, 2H), 3.95 (d, J=7.8 Hz, 1H), 3.86 (dd, J=8.0, 3.3 Hz, 2H), 3.41 (td, J=11.4, 2.1 Hz, 2H), 1.87 (d, J=10.3 Hz, 2H), 1.49-1.40 (m, 2H); HRMS (ESI$^+$) calculated for C$_{21}$H$_{24}$N$_5$O$_3$ [M+H]$^+$: 394.4545, found 394.4279.

9a (Chemical Formula 1-2, white solid, 30%); $^1$H NMR (400 MHz, DMSO) δ 8.82 (s, 2H), 8.50 (s, 1H), 8.11 (d, J=5.7 Hz, 1H), 7.52-7.48 (m, 2H), 7.44-7.35 (m, 3H), 7.08 (dd, J=5.8, 2.0 Hz, 1H), 6.97 (d, J=1.7 Hz, 1H), 5.12 (s, 2H), 4.49-4.41 (m, 1H), 3.51-3.42 (m, 1H), 3.28-3.24 (m, 1H), 3.09 (dt, J=11.0, 4.3 Hz, 1H), 2.23 (dt, J=20.9, 7.3 Hz, 2H), 1.93 (dd, J=15.9, 9.5 Hz, 2H); HRMS (ESI$^+$) calculated for C$_{21}$H$_{25}$N$_6$O$_2$ [M+H]$^+$: 393.4705, found 393.4556.

10a (Chemical Formula 1-3, yellow solid, 57%); $^1$H NMR (400 MHz, DMSO) δ 8.48-8.43 (m, 1H), 8.06 (dd, J=5.5, 3.6 Hz, 1H), 7.53-7.48 (m, 2H), 7.43-7.33 (m, 3H), 6.97 (d, J=12.6 Hz, 1H), 6.85 (s, 1H), 5.11 (d, J=5.8 Hz, 2H), 4.81-4.73 (m, 1H), 4.04 (s, 1H), 3.09 (s, 1H), 2.78 (s, 1H), 1.95 (d, J=13.7 Hz, 2H), 1.47 (s, 2H), 1.30-1.25 (m, 2H); HRMS (ESI$^+$) calculated for C$_{20}$H$_{23}$N$_6$O$_2$ [M+H]$^+$: 379.4435, found 379.4460.

13a (Chemical Formula 1-4, brown solid, 73%); $^1$H NMR (400 MHz, DMSO) δ 9.27 (s, 1H), 8.53 (s, 1H), 8.24 (d, J=5.7 Hz, 1H), 7.71-7.65 (m, 2H), 7.52 (dd, J=6.9, 5.3 Hz, 3H), 7.45-7.40 (m, 2H), 7.39-7.34 (m, 1H), 7.31 (d, J=1.6 Hz, 1H), 7.28 (dd, J=8.5, 7.5 Hz, 3H), 7.22 (dd, J=5.7, 2.0 Hz, 1H), 6.92 (t, J=7.3 Hz, 1H), 5.14 (s, 2H). HRMS (ESI$^+$) calculated for C$_{22}$H$_{20}$N$_5$O$_2$ [M+H]$^+$: 386.4345, found 386.2887.

13b (Chemical Formula 1-5, 45%); $^1$H NMR (400 MHz, DMSO) δ 9.28 (s, 1H), 8.60 (s, 1H), 8.25 (d, J=5.7 Hz, 1H), 7.89 (d, J=7.6 Hz, 1H), 7.82 (d, J=7.8 Hz, 1H), 7.77 (t, J=7.6 Hz, 1H), 7.71-7.66 (m, 2H), 7.62 (t, J=7.6 Hz, 1H), 7.53 (s, 1H), 7.32 (d, J=1.6 Hz, 1H), 7.31-7.24 (m, 4H), 6.92 (t, J=7.3 Hz, 1H), 5.28 (s, 2H); HRMS (ESI$^+$) calculated for C$_{23}$H$_{19}$F$_3$N$_5$O$_2$ [M+H]$^+$: 454.4327, found 454.3178.

14a (Chemical Formula 1-6, yellow solid 73%); $^1$H NMR (400 MHz, DMSO) δ 8.47 (s, 1H), 8.26 (s, 1H), 8.23-8.19 (m, 2H), 7.55-7.46 (m, 4H), 7.45-7.39 (m, 2H), 7.38 (dd, J=5.0, 3.6 Hz, 1H), 7.28 (s, 1H), 7.22 (dd, J=5.7, 1.9 Hz, 1H), 7.03 (dd, J=8.0, 1.6 Hz, 1H), 6.97 (td, J=7.7, 1.8 Hz, 1H), 6.93 (dd, J=7.7, 1.7 Hz, 1H), 5.13 (s, 2H), 3.85 (s, 3H). HRMS (ESI$^+$) calculated for C$_{23}$H$_{22}$N$_5$O$_3$ [M+H]$^+$: 416.4605, found 416.2883.

14b (Chemical Formula 1-7, white solid 67%): $^1$H NMR (400 MHz, DMSO) δ 8.53 (s, 1H), 8.24 (dd, J=8.6, 2.6 Hz, 2H), 8.21 (d, J=5.7 Hz, 1H), 7.89 (d, J=7.7 Hz, 1H), 7.82 (d, J=7.8 Hz, 1H), 7.77 (t, J=7.6 Hz, 1H), 7.62 (t, J=7.7 Hz, 1H), 7.51 (d, J=5.7 Hz, 1H), 7.49 (d, J=1.8 Hz, 1H), 7.30 (s, 1H), 7.26 (dd, J=5.7, 1.9 Hz, 1H), 7.03 (dd, J=8.0, 1.6 Hz, 1H), 6.97 (td, J=7.7, 1.8 Hz, 1H), 6.92 (td, J=7.6, 1.7 Hz, 1H), 5.28 (s, 2H), 3.86 (s, 3H). HRMS (ESI$^+$) calculated for C$_{24}$H$_{21}$F$_3$N$_5$O$_3$ [M+H]$^+$: 484.4587, found 484.3156.

2.7. Synthesis of ethyl 4-(benzyloxy)-1-(2-(phenylamino)pyridin-4-yl)-1H-pyrazole-3-carboxylate (11a-11c, 12a-12c)

Compound 4 (0.0293 mmol) was dissolved in aniline or anisidine (0.134 mL, 50 eq) and the mixture was stirred at 120° C. for 18 hours. After completion of the reaction, the reaction mixture was cooled to room temperature and worked up with ethyl acetate and water. The organic layer was dried with anhydrous sodium sulfate (Na$_2$SO$_4$) and the solvent was evaporated. Then, compound 11a (62%) was obtained by conducting column chromatography using EA:Hex (1:3.5). $^1$H NMR (400 MHz, DMSO) δ 9.36 (s, 1H), 8.62 (s, 1H), 8.26 (d, J=5.7 Hz, 1H), 7.70 (dd, J=8.6, 1.0 Hz, 2H), 7.52-7.47 (m, 2H), 7.45-7.40 (m, 2H), 7.39-7.34 (m, 2H), 7.30-7.25 (m, 2H), 7.22 (dd, J=5.8, 2.0 Hz, 1H), 6.92 (t, J=7.3 Hz, 1H), 5.13 (s, 2H), 4.32 (q, J=7.1 Hz, 2H), 1.31 (t, J=7.1 Hz, 3H). HRMS (ESI$^+$) calculated for C$_{24}$H$_{23}$N$_4$O$_3$ [M+H]$^+$: 415.4725, found 415.3159.

12a (79%); $^1$H NMR (400 MHz, DMSO) δ 8.56 (s, 1H), 8.45 (s, 1H), 8.21 (dd, J=6.7, 5.2 Hz, 2H), 7.54-7.47 (m, 3H), 7.45-7.39 (m, 2H), 7.36 (dt, J=9.6, 4.3 Hz, 1H), 7.19 (dd, J=5.7, 2.0 Hz, 1H), 7.03 (dd, J=8.0, 1.6 Hz, 1H), 6.97 (td, J=7.7, 1.7 Hz, 1H), 6.91 (td, J=7.6, 1.6 Hz, 1H), 5.12 (s, 2H), 4.32 (q, J=7.1 Hz, 2H), 3.85 (s, 3H), 1.31 (t, J=7.1 Hz, 3H). HRMS (ESI$^+$) calculated for C$_{25}$H$_{25}$N$_4$O$_4$ [M+H]$^+$: 445.4985, found 445.3159.

11b (42%); $^1$H NMR (400 MHz, DMSO) δ 9.37 (s, 1H), 8.71 (s, 1H), 8.27 (d, J=5.7 Hz, 1H), 7.93 (d, J=7.6 Hz, 1H), 7.79 (dd, J=17.5, 7.9 Hz, 2H), 7.71 (dd, J=8.6, 1.0 Hz, 2H), 7.61 (t, J=7.6 Hz, 1H), 7.39 (d, J=1.6 Hz, 1H), 7.31-7.25 (m, 3H), 6.92 (t, J=7.3 Hz, 1H), 5.27 (s, 2H), 4.32 (q, J=7.1 Hz, 2H), 1.30 (t, J=7.1 Hz, 3H). HRMS (ESI$^+$) calculated for C$_{25}$H$_{22}$F$_3$N$_4$O$_3$ [M+H]$^+$: 483.4707, found 483.3433.

12b (48%); $^1$H NMR (400 MHz, DMSO) δ 8.64 (s, 1H), 8.46 (s, 1H), 8.22 (dd, J=5.5, 3.9 Hz, 2H), 7.93 (d, J=7.7 Hz, 1H), 7.79 (dd, J=17.2, 8.0 Hz, 2H), 7.61 (t, J=7.6 Hz, 1H), 7.55 (dd, J=4.9, 1.7 Hz, 1H), 7.24 (dd, J=5.7, 2.0 Hz, 1H), 7.04-7.01 (m, 1H), 6.97 (td, J=7.7, 1.8 Hz, 1H), 6.92 (td, J=7.6, 1.6 Hz, 1H), 5.27 (s, 2H), 4.32 (q, J=7.1 Hz, 2H), 3.85 (s, 3H), 1.30 (t, J=7.1 Hz, 3H). HRMS (ESI$^+$) calculated for C$_{26}$H$_{24}$F$_3$N$_4$O$_4$ [M+H]$^+$: 513.4967, found 513.3765.

11c (63%); $^1$H NMR (400 MHz, DMSO) δ 9.36 (s, 1H), 8.71 (s, 1H), 8.27 (d, J=5.7 Hz, 1H), 7.73-7.69 (m, 2H), 7.67 (d, J=7.9 Hz, 1H), 7.44 (s, 1H), 7.39 (d, J=1.7 Hz, 1H), 7.35 (d, J=7.8 Hz, 1H), 7.31-7.24 (m, 3H), 6.92 (t, J=7.3 Hz, 1H), 5.17 (s, 2H), 4.75 (s, 2H), 4.32 (q, J=7.1 Hz, 2H), 1.31 (t, J=7.1 Hz, 3H), 0.91 (s, 9H), 0.09 (s, 6H). HRMS (ESI$^+$)

calculated for $C_{31}H_{38}$ $ClN_4O_4Si$ $[M+H]^+$: 593.2345/594.2035, found 593.4264./595.4789.

12c (81%); $^1$H NMR (400 MHz, DMSO) δ 8.64 (s, 1H), 8.45 (s, 1H), 8.24-8.19 (m, 2H), 7.67 (d, J=7.9 Hz, 1H), 7.54 (d, J=1.8 Hz, 1H), 7.44 (s, 1H), 7.35 (d, J=7.9 Hz, 1H), 7.23 (dd, J=5.7, 2.0 Hz, 1H), 7.03 (dd, J=8.0, 1.6 Hz, 1H), 6.97 (td, J=7.7, 1.8 Hz, 1H), 6.94-6.89 (m, 1H), 5.17 (s, 2H), 4.75 (s, 2H), 4.32 (q, J=7.1 Hz, 2H), 3.85 (s, 3H), 1.31 (t, J=7.1 Hz, 3H), 0.91 (s, 9H), 0.09 (s, 6H). HRMS (ESI$^+$) calculated for $C_{32}H_{40}ClN_4O_5Si$ $[M+H]^+$: 623.2451/624.2295, found 623.4216/625.4381.

2.8. Synthesis of 4-((2-chloro-4-(hydroxymethyl) benzyl)oxy)-1-(2-(phenylamino)pyridin-4-yl)-1H-pyrazole-3-carboxamide (15, 17)

After adding 1.45 mL of 7 N NH$_3$ in MeOH to compound 11c (0.0244 mmol), the mixture was stirred at 60° C. for 24 hours. After completion of the reaction, the reaction mixture was cooled to room temperature and concentrated in vacuo to obtain compound ethyl 4-((4-(((tert-butyldimethylsilyl)oxy)methyl)-2-chlorobenzyl)oxy)-1-(2-(phenylamino)pyridin-4-yl)-1H-pyrazole-3-carboxylate. Next, the product (0.0244 mmol) was dissolved in 0.244 mL of THF and 1 M teterabutylammonium fluoride (0.0244 mmol) in THF was added slowly. After completion of the reaction, work-up was performed with ethyl acetate and a saturated NH$_4$Cl solution. The organic layer was dried with anhydrous sodium sulfate (Na$_2$SO$_4$) and the solvent was evaporated. Then, compound 15 (Chemical Formula 1-8, 60%) was obtained by conducting column chromatography using MC:MeOH (40:1). $^1$H NMR (400 MHz, DMSO) δ 9.27 (s, 1H), 8.61 (s, 1H), 8.24 (d, J=5.7 Hz, 1H), 7.68 (dd, J=8.6, 1.0 Hz, 2H), 7.63 (d, J=7.9 Hz, 1H), 7.54 (s, 1H), 7.46 (s, 1H), 7.35-7.31 (m, 2H), 7.30-7.22 (m, 4H), 6.92 (t, J=7.3 Hz, 1H), 5.35 (t, J=5.8 Hz, 1H), 5.19 (s, 2H), 4.52 (d, J=5.8 Hz, 2H). HRMS (ESI$^+$) calculated for $C_{23}H_{21}ClN_5O_5$ $[M+H]^+$: 450.9025, found 450.2848.

17 (Chemical Formula 1-10, 67%); $^1$H NMR (400 MHz, DMSO) δ 8.54 (s, 1H), 8.27-8.19 (m, 3H), 7.63 (d, J=7.9 Hz, 1H), 7.53 (s, 1H), 7.49 (d, J=1.8 Hz, 1H), 7.46 (d, J=1.3 Hz, 1H), 7.33 (d, J=7.8 Hz, 1H), 7.30-7.23 (m, 2H), 7.03 (dd, J=7.9, 1.6 Hz, 1H), 6.99-6.94 (m, 1H), 6.92 (dd, J=7.5, 5.9 Hz, 1H), 5.35 (t, J=5.8 Hz, 1H), 5.19 (s, 2H), 4.52 (d, J=5.8 Hz, 2H), 3.86 (s, 3H). HRMS (ESI$^+$) calculated for $C_{26}H_{28}ClN_6O_3$ $[M+H]^+$: 480.9285, found 480.3184.

2.9. Synthesis of 4-((2-chloro-4-((dimethylamino)methyl)benzyl)oxy)-1-(2-(phenylamino)pyridin-4-yl)-1H-pyrazole-3-carboxamide (16, 18)

After dissolving compound 15 (9.56 mmol) in 0.1 mL of MC, triethylamine (10.5 mmol) and methanesulfonyl chloride (14.3 mmol) were sequentially added dropwise at 0° C., followed by stirring for 3 hours. After completion of the reaction, the organic layer was extracted using water and methylene chloride. The organic layer was dried with anhydrous sodium sulfate and the solvent was evaporated, and the next reaction was proceeded immediately. The obtained compound (0.00956 mmol) was dissolved in 0.1 mL of THF and stirred at 60° C. for 18 hours after adding dimethylamine (19.1 mmol) and DIPEA (19.1 mmol). After completion of the reaction, the reaction mixture was cooled to room temperature and worked up with ethyl acetate and water. The organic layer was dried with anhydrous sodium sulfate and the solvent was evaporated. Then, compound 16 (Chemical Formula 1-9) was obtained as a white solid (50%) by purifying by column chromatography using MC:MeOH (10:1). $^1$H NMR (400 MHz, DMSO) δ 9.27 (s, 1H), 8.61 (s, 1H), 8.24 (d, J=5.7 Hz, 1H), 7.71-7.66 (m, 2H), 7.63 (d, J=7.8 Hz, 1H), 7.54 (s, 1H), 7.44 (s, 1H), 7.34-7.31 (m, 2H), 7.30-7.23 (m, 4H), 6.92 (t, J=7.3 Hz, 1H), 5.19 (s, 2H), 3.42 (s, 2H), 2.16 (s, 6H). HRMS (ESI$^+$) calculated for $C_{25}H_{26}ClN_6O_2$ $[M+H]^+$: 477.9725, found 477.4014.

18 (Chemical Formula 1-11, white solid, 39%); $^1$H NMR (400 MHz, DMSO) δ 8.54 (s, 1H), 8.27-8.19 (m, 3H), 7.63 (d, J=7.8 Hz, 1H), 7.54-7.48 (m, 2H), 7.44 (d, J=1.3 Hz, 1H), 7.32 (d, J=7.8 Hz, 1H), 7.29 (s, 1H), 7.25 (dd, J=5.7, 1.9 Hz, 1H), 7.03 (dd, J=7.9, 1.6 Hz, 1H), 6.97 (td, J=7.7, 1.8 Hz, 1H), 6.92 (td, J=7.6, 1.7 Hz, 1H), 5.18 (s, 2H), 3.86 (s, 3H), 3.41 (s, 2H), 2.15 (s, 6H); HRMS (ESI$^+$) calculated for $C_{26}H_{28}ClN_6O_3$ $[M+H]^+$: 507.9985, found 507.5428.

3. Evaluation of IC$_{50}$ Values and Selected Kinase Profiling

All the 1-pyridyl-4-substituted-pyrazole-3-carboxamide derivatives 8a-10a, 13a-b, 14a-b and 15-18 were evaluated for inhibitory activity (IC$_{50}$) against PLK1 kinase and compound 15 was screened for various kinases. IC$_{50}$ Profiler Express was used for IC$_{50}$ measurement and Reaction Biology Corp. Kinase Hot Spot$^{SM}$ service (www.reactionbiology.com) was used for screening of compound 15 (10 μM).

The analysis protocol was as follows. 1 μM substrate (casein), 10 μM ATP and PLK1(h) (5-10 mU) were incubated with 25 mM Tris pH 7.5, 0.02 mM EGTA, 0.66 mg/mL myelin basic protein, 10 mM Mg acetate and [33P-ATP] (specific activity of about 500 cpm/pmol, concentration as required) in a reaction solution with a final volume of 25 μL. The reaction was initiated by adding Mg-ATP mixture. After incubation at room temperature for 40 minutes, the reaction was stopped by adding 5 μL of a 3% phosphoric acid solution. 10 μL of the reaction solution was spotted on a P30 filter mat and washed 3 times for 5 minutes in 75 mM phosphoric acid and once in methanol prior to drying and scintillation counting. The 30 selected protein kinases were ABL1, AKT1, ALK, Aurora A, AXL, AXL (R499C), BRAF (V599E), BTK, c-MER, c-MET, c-Src, CAMKK1, CDK1/cyclin A, EGFR, ERK1, FGFR3, FYN, IGF1R, JAK3, KDR/VEGFR2, LCK, LYN, MEK1, PKA, PLK1, PLK2, PLK3, PLK4/SAK, SYK and TYRO3/SKY4.

As a result, the compounds of the present disclosure, especially the compounds having 2,4-substituted benzyloxy moieties at the 4-position in the pyrazole core exhibited inhibitory activity against PLK1. Among the evaluated compounds, compound 15 showed the most potent activity against PLK1, with IC$_{50}$ of 219 nM (Table 2).

TABLE 2

| No | $R^1$ | $R^2$ | $R^3$ | $R^4$ | PLK1 IC$_{50}$ (μM) |
|---|---|---|---|---|---|
| 8a |  | H | H | H | >10 |
| 9a |  | H | H | H | >10 |
| 10a |  | H | H | H | >10 |
| 13a |  | H | H | H | 9.89 |
| 13b |  | CF$_3$ | H | H | 0.847 |
| 14a |  | H | H | H | 1.02 |
| 14b |  | CF$_3$ | H | H | 1.31 |
| 15 |  | Cl | OH | H | 0.219 |
| 16 |  | Cl | N(Me)$_2$ | H | 1.01 |
| 17 |  | Cl | OH | H | 0.312 |
| 18 |  | Cl | N(Me)$_2$ | H | 0.998 |
| Control |  | Staurosporine |  |  | 0.143 |

4. Molecular Modeling

To better understand the interactions between the compounds of the present disclosure and PLK1, molecular docking of compound 15 in the ATP-binding pocket of PLK1 (PDB: 3KB7) was studied using Glide (SCHRODINGER software package version 14.2).

Figure 3:
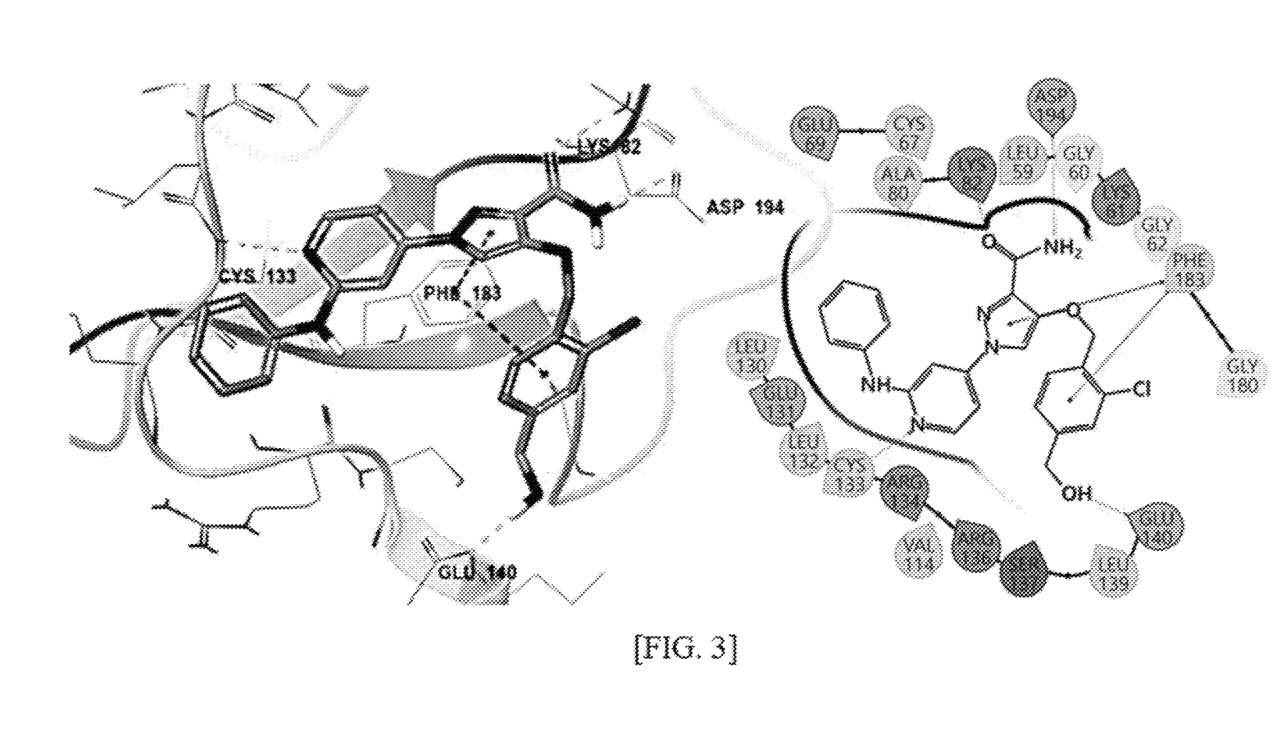
FIG. 3 shows docking structure and 2D-interaction map of compound 15 (Chemical Formula 1-8) for PLK1 (PDB: 3KB7).

Protein and ligand preparations were conducted with Schrödinger's tools at standard settings, and Glide was used for docking and scoring. The 3D X-ray protein structure of wild-type PLK1 as a complex with a ligand was obtained from the PDB (code: 3KB7) and prepared using the Protein Preparation Wizard of the Schrödinger Maestro program. All water molecules were removed from the structure, and the structure was selected as a template. The structures of the inhibitors were drawn using Chemdraw and their 3D conformations were generated using the Schrödinger LigPrep program with the OPLS 2005 force field. Molecular docking of the compound into the structure of wild-type PLK1 (PDB code: 3KB7) was carried out using Schrödinger Glide version 12.2. The result is shown in FIG. 3.

In the binding mode, compound 15 was tightly bound to the ATP-binding site of PLK1 via several hydrogen bonds and π-π interactions. The most important interactions seemed to be a pair of hydrogen bonds between carboxamide and Lys82 or Asp194. Further, the nitrogen of pyridine, as a hinge binder, formed a hydrogen bond with the amino hydrogen of Cys133. The pyrazole core and benzyl ring in the 3-benzyloxy group of compound 15 formed π-π interactions with Phe184. In addition, the 4-methylenehydroxy group of the benzyloxy tail exhibited a hydrogen bond with Glu140, explaining the better potency as compared to an unsubstituted benzyl group (vs 13a, 14a).

While the specific exemplary embodiments of the present disclosure have been described referring to the drawings, those having ordinary knowledge in the art can make various technical modifications and changes based thereon. For example, adequate results may be achieved even when the specific exemplary embodiments are replaced or substituted with their equivalents.

Accordingly, other exemplary embodiments and their equivalents are encompassed in the scope of the appended claims.

INDUSTRIAL APPLICABILITY

The present disclosure relates to a pyridinylpyrazole derivative or a pharmaceutically acceptable salt thereof, and a composition for preventing or treating a protein kinase-related disease, which contains the derivative or salt as an active ingredient. Since the pyridinylpyrazole derivative of the present disclosure exhibits cytotoxicity by inhibiting polo-like kinase 1 (PLK1), which induces cell proliferation, when administered to an individual, it can be used for prevention or treatment of a protein kinase-related disease, specifically for prevention or treatment of cancer.

The invention claimed is:

1. A pyridinylpyrazole derivative represented by [Chemical Formula 1] or a pharmaceutically acceptable salt thereof:

[Chemical Formula 1]

wherein
R$^1$ is any one selected from the group consisting of a substituted or unsubstituted $C_1$-$C_9$ chain alkyl group or cyclic alkyl group, a substituted or unsubstituted $C_3$-$C_9$ heterocycloalkyl group, and a substituted or unsubstituted $C_5$-$C_9$ aryl group or heteroaryl group,
each of R$^2$ and R$^3$, which are identical to or different from each other, is independently any one selected from a group consisting of hydrogen, a halogen group, a trifluoromethyl group, a hydroxyl group, and a $C_1$-$C_9$ alkylamino group, and
R$^4$ is hydrogen or a $C_1$-$C_9$ chain alkyl group.

2. The pyridinylpyrazole derivative or the pharmaceutically acceptable salt thereof according to claim 1, wherein the substituted aryl group is substituted with a $C_1$-$C_9$ alkyl group or alkoxy group.

3. The pyridinylpyrazole derivative or the pharmaceutically acceptable salt thereof according to claim 1, wherein the R$^1$ is any one selected from the group consisting of

4. The pyridinylpyrazole derivative or the pharmaceutically acceptable salt thereof according to claim 1, wherein the R$^2$ is any one selected from the group consisting of hydrogen, a halogen group, and a trifluoromethyl group.

5. The pyridinylpyrazole derivative or the pharmaceutically acceptable salt thereof according to claim 1, wherein the R$^3$ is any one selected from the group consisting of hydrogen, a hydroxyl group, and a $C_1$-$C_3$ alkylamino group.

6. The pyridinylpyrazole derivative or the pharmaceutically acceptable salt thereof according to claim 1, wherein
the R$^2$ is located at the ortho position, and
the R$^3$ is located at the para position.

7. The pyridinylpyrazole derivative or the pharmaceutically acceptable salt thereof according to claim 1, wherein the pyridinylpyrazole derivative represented by [Chemical Formula 1] is any one selected from the group consisting of compounds represented by the following chemical formulas:

[Chemical Formula 1-1]

[Chemical Formula 1-2]

[Chemical Formula 1-3]

[Chemical Formula 1-4]

-continued

[Chemical Formula 1-5]

[Chemical Formula 1-6]

[Chemical Formula 1-7]

[Chemical Formula 1-8]

[Chemical Formula 1-9]

[Chemical Formula 1-10]

[Chemical Formula 1-11]

8. The pyridinylpyrazole derivative or the pharmaceutically acceptable salt thereof according to claim 1, wherein the pyridinylpyrazole derivative or the pharmaceutically acceptable salt thereof inhibits polo-like kinase 1 (PLK1).

9. A composition for inhibiting polo-like kinase 1 (PLK1), comprising the pyridinylpyrazole derivative or the pharmaceutically acceptable salt thereof according to claim 1 as an active ingredient.

10. A pharmaceutical composition for preventing or treating cancer, comprising the pyridinylpyrazole derivative or the pharmaceutically acceptable salt thereof according to claim 1 as an active ingredient.

11. The pharmaceutical composition according to claim 10, wherein the cancer is one or more selected from the group consisting of skin cancer, breast cancer, uterine cancer, esophageal cancer, stomach cancer, a brain tumor, colon cancer, rectal cancer, colorectal cancer, lung cancer, ovarian cancer, cervical cancer, endometrial cancer, vulvar cancer, kidney cancer, blood cancer, pancreatic cancer, prostate cancer, testicular cancer, laryngeal cancer, head and neck cancer, thyroid cancer, liver cancer, bladder cancer, osteosarcoma, lymphoma, leukemia, thymus cancer, urethral cancer, and bronchial cancer.

\* \* \* \* \*